United States Patent [19]

Opel et al.

[11] 4,456,308

[45] Jun. 26, 1984

[54] WHEEL AND BRAKE-DRUM CONFIGURATION FOR VEHICLES

[75] Inventors: Paul Opel, Langenfeld; Klaus Herbst, Solingen; Heinz Brinkmann, Hagen; Albrecht Lüders, Haan; Hans P. Wolsdorf, Eichwald-Krummhardt, all of Fed. Rep. of Germany

[73] Assignee: Mannesmann AG, Solingen, Fed. Rep. of Germany

[21] Appl. No.: 427,865

[22] Filed: Sep. 29, 1982

Related U.S. Application Data

[63] Continuation of Ser. No. 173,829, Jul. 31, 1980, abandoned.

[30] Foreign Application Priority Data

Jul. 31, 1979 [DE] Fed. Rep. of Germany ....... 2931400

[51] Int. Cl.$^3$ .......................... B60B 3/14; B60B 11/00
[52] U.S. Cl. ............................... 301/9 DN; 188/18 R; 188/218 R; 301/6 WB; 301/36 R
[58] Field of Search ................... 188/18 R, 18 A, 17, 188/218, 71.1, 58, 59, 205, 206, 71.6, 264 A, 264 AA, 264 G; 301/36 R, 6 V, 6 E, 6 WB, 6 R, 6 A, 6 D, 6 S, 9 DN, 13 SM, 11 R, 10 R, 6 W, 13 R, 6 CS, 6 CF, 126, 135, 63; 192/107 R, 113 A

[56] References Cited

U.S. PATENT DOCUMENTS

| 2,485,993 | 10/1949 | Van Halteren | 188/218 R |
| 2,545,130 | 3/1951 | Ash | 301/9 DN X |
| 3,366,421 | 1/1968 | Bradley | 301/9 DN |

FOREIGN PATENT DOCUMENTS

| 2636996 | 2/1978 | Fed. Rep. of Germany |  |
| 244342 | 12/1925 | United Kingdom | 301/36 R |

Primary Examiner—Douglas C. Butler
Attorney, Agent, or Firm—Ralf H. Siegemund

[57] ABSTRACT

A brake-drum flange is bolted to a wheel disk by an interface surface structure which limits the engagement area and avoids contact around the fastening bolts. In the case of a twin-wheel configuration, the two wheels are placed back-to-back, whereby the contact area has larger diameters than the contact areas between the brake drum and the one-wheel disk.

6 Claims, 5 Drawing Figures

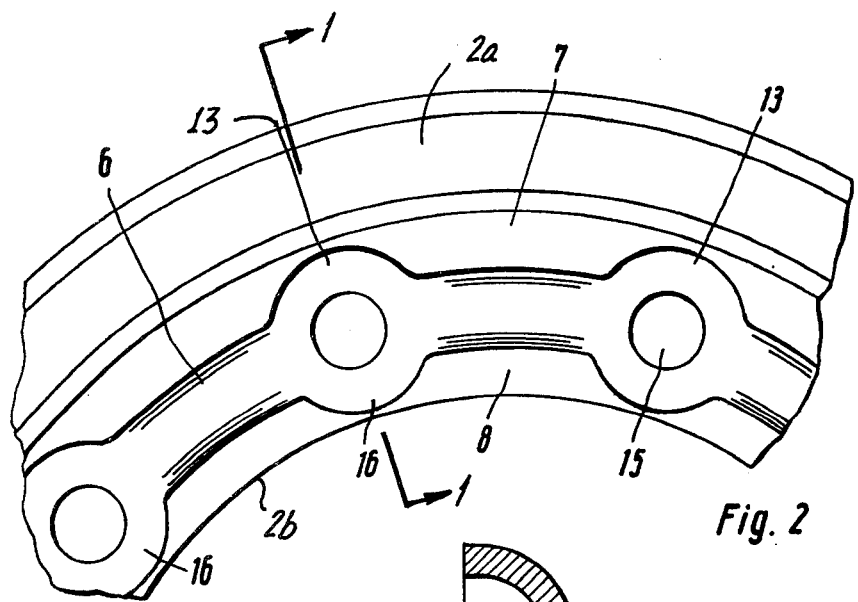
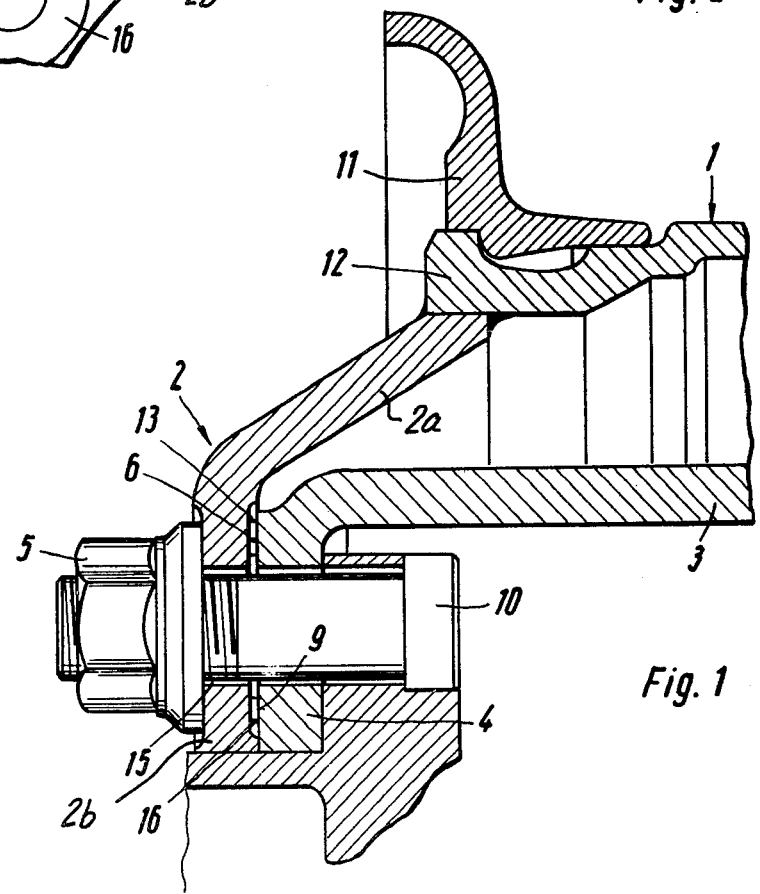
Fig. 2
Fig. 1

WHEEL AND BRAKE-DRUM CONFIGURATION FOR VEHICLES

This is a continuation of application Ser. No. 173,829, filed July 31, 1980, now abandoned.

BACKGROUND OF THE INVENTION

The present invention relates to a wheel construction for vehicles, to be used singly or in a twin-configuration.

The German Pat. No. 26,36,996 discloses a wheel for vehicles having a common hub flange for the brake drum and the wheel disk. The flange is provided with a plurality of annularly arranged bores for receiving the wheel bolts. The assembled elements including the flange have interfacing abutment surfaces which are finely finished by means of polishing, turning, or plane cutting in order to obtain true planar interfacing and abutting surfaces.

In cases, excessive force act on the wheel which must be expected but may give rise to the formation of cracks. Moreover, the various, normally abutting, surfaces do move by a very small distance in relation to each other, by a thousandth of an inch, or thereabouts. This phenomenon is sometimes referred to as "breathing" because moisture is sucked into the interface space, very little but enough to produce gradually progressing corrosion. This, in turn, reduces the life span of the wheel.

DESCRIPTION OF THE INVENTION

It is an object of the present invention to improve the interface surface structure of wheel structures of the type referred to above generally, to avoid the "breathing" problem as well as the formation of cracks.

It is a companion object of the present invention to improve the interconnection of a wheel to a brake drum in order to increase the life span of the wheel.

It is another companion object of the present invention to improve wheel-to-wheel connections for increasing the life span of such a twin-wheel construction.

It is a particular object of the present invention to increase fatigue and endurance limits of a wheel as connected to another wheel and/or a brake drum.

The invention is based on the recognition of the fact that the traversal of the interface or interfaces as between a wheel dish or disk, and the brake drum and/or another wheel dish or disk is responsible for the formation of cracks, particularly so in the dish or disk of the wheel just referred to. The invention is based further on the recognition of the fact that the relationship of multiple abutment surfaces to each other have a direct relation to the phenomenon of "breathing."

In accordance with the preferred embodiment of the present invention, it is suggested to interface a wheel dish or disk with a brake drum flange by means of two concentric and, preferably, separated plane abutment surfaces, e.g., on the dish or disk, these two surfaces being separated by an indentation or annular recess having widened portions preferably completely surrounding the bores traversing the dish or disk in order to receive the bolts by means of which the dish or disk is bolted to the brake drum flange. The latter may have one single or two concentric surfaces which abut the dish or disk abutment surfaces in true surface-to-surface contact.

In the case of a twin wheel, the dish or disk of the second one is fastened back-to-back to the first one, whereby radially outermost abutting interface surfaces of the two wheels have a smallest diameter that is larger than the largest diameter of abutting interface surfaces between the one wheel and the brake drum flange.

The inventive construction thus provides for particular relationships between interface surface portions and, particularly in the case of the brake-to-wheel interface, reduces the total effective interfacing surface area to, thereby, increase the per-unit area pressure force between them. This, in particular, avoids or drastically reduces "breathing." Moreover, the particular surface configuration by means of which breathing is avoided or reduced is directly instrumental in avoiding abutting surfaces that directly surround the bores for the fastening bolts. This feature reduces the probability of crack formation.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 1 is a fragment of a cross section through a wheel with a flat bed rim and a brake drum on a hub, and showing the improvement for practicing the preferred embodiment of the invention in accordance with the best mode thereof as applied to a wheel-to-brake drum connection.

FIG. 2 is a front view of a portion of the wheel and, particularly, of the interface surface thereof, showing also the plane (1—1) in which the section of FIG. 1 is taken;

Proceeding now to the detailed description of the drawings, FIG. 1 illustrates a wheel rim 1 to which is mounted an annulus or ring 11 for a compound rim configuration. The ring sits, in particular, against and on a hook-shaped flange 12 of rim element 1. The second major wheel element is a dish-shaped disk 2, being seam-welded on both sides of its radial outer edge to a portion of rim 1 from which flange 12 extends upwardly (and outwardly).

Figure 4:
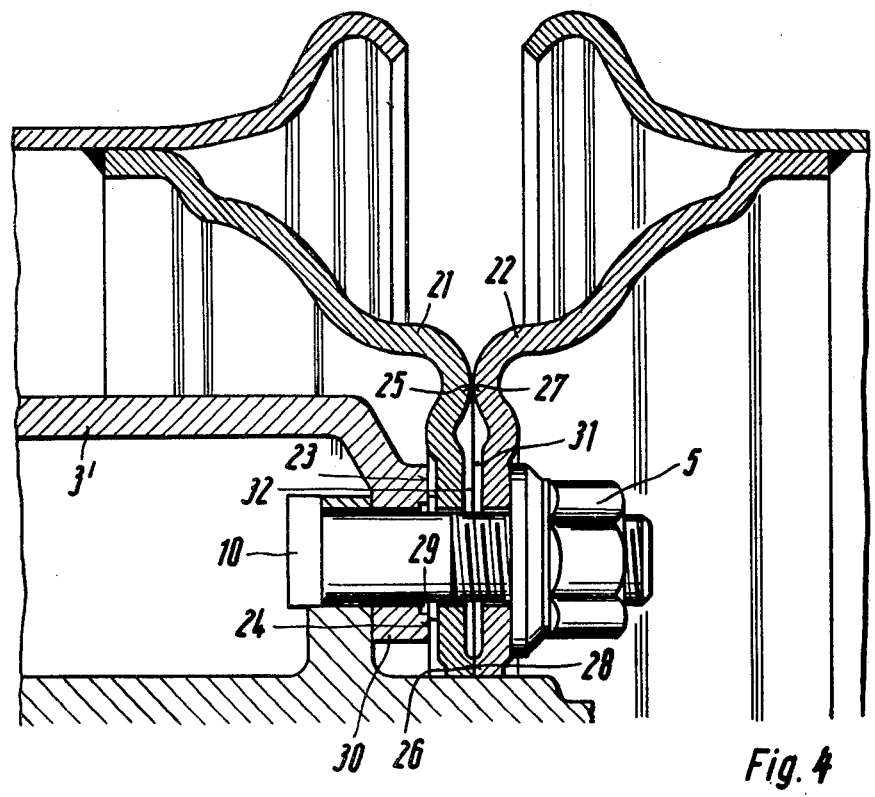
FIG. 4 is a cross section through a portion of a twin-wheel-plus-brake-drum assembly, showing the inventive concept as applied to this kind of assembly in accordance with practicing the best mode of the preferred embodiment.

Wheel disk 2 has a conical portion 2a from which extends, radially inwardly, a flange 2b having a particular annular surface portion. That surface is provided to interface with a facing surface portion of a flange 4 which extends radially inwardly from one end of a brake drum 3. Bolts, such as bolts 10, and nuts, such as nuts 5, fasten elements 2 and 3 together.

Turning now to particulars of the interface structure between wheel disk 2 and drum 3, that annular interface is traversed by a circular or annular arrangement of bolts 10. These bolts are received in bores, such as bores 15 in flange element 2b, and are respectively aligned with bores in brake drum flange 4. The interface surface of flange 2b is, in effect, divided into two annular portions, portion 7 being an outer one and portion 8 the inner one of the two. These surface portions 7 and 8 are, e.g., highly polished true. They are separated by an annular indentation 6 being concentric as to the wheel axis. The indent 6 may have a depth of about 0.2 mm to 0.5 mm (approximately 8/1000th to 20/1000th of an inch). This indentation or flat annular channel is widened by means of partially circular indent or recess portions 13 and 16 of like depth and circumscribing in pairs, respectively the bores 15. This indentation 6 may have been produced by punching or stamping. Actually, it is the result of that pressworking process that the interface surface under consideration is divided into the two portions 7 and 8.

The outer interface surface 7 can be deemed to be situated precisely in the plane which will become the interface plane with flange 4. The inner interface surface 8 may be slightly recessed in order to obtain a tensioning action when these interface surfaces are tightly bolted to true, planar interface surface 9 of brake drum flange 4.

It can readily be seen that indent configurations 6, 13, and 16, as described, are relatively small; and the total area of contact between elements 2 and 3 (4) is reduced to thinly interconnected surface portions and segments. Thus, the per-unit area of force of interengagement is relatively high, which reduces the tendency of breathing, mentioned above.

Upon assembly, the two surface portions 7 and 8 abut the single-plane interface surface 9 of brake drum flange 4. The surface 9 could be provided with an annular recess similar to recess portions 6, 13, and 16; but that is not necessary. At least the particular portion of surface 9, which will abut against surface portion 7 of wheel disk 2, is to be fine-finished, as described, so that all abutment points are true and in one plane. Thus, there must be true surface-to-surface abutment without distortion of the brake drum.

The recess portions 13 and 16 around each bore 15 are provided, particularly, in order to avoid or reduce local stress peaks and to avoid, therewith, the formation of cracks adjacent to the respective bore and, specifically, in between bores 15.

Figure 3:
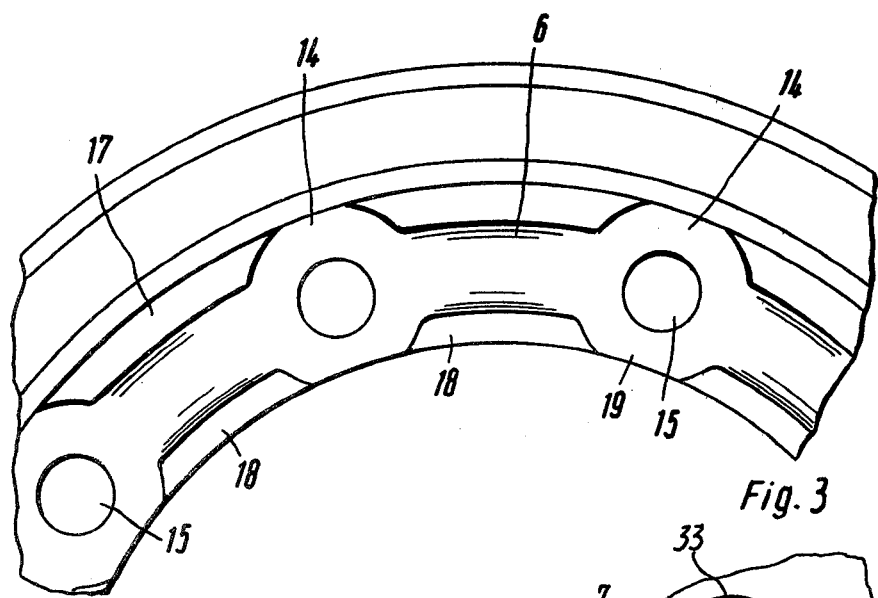
FIG. 3 is a plan view similar to the one in FIG. 2, but showing a slight modification.

FIG. 3 shows a modification of the interface surface configuration for the wheel. The indentations 19 around the bores 15 extend to the inner rim of the wheel dish and radially outward (14) to the outer boundary of the abutment surface. Thus, the radially outer abutment surface (surface portion 7 in FIG. 2) is divided into segments 17; and the same is true for the radially inner abutment surface, being comprised here of segments 18.

FIG. 4 illustrates how the inventive concept can be applied to twin wheels. The wheels include particularly contoured wheel dishes 21 and 22, respectively carrying rim elements, as described, e.g., in U.S. Pat. No. 3,787,092. The two-wheel dishes are juxtaposed and mounted back-to-back; they define a common interface plane. Dish 21 has a radially outer abutment surface 25 and a radially inner abutment surface 26 located in that interface plane. These interface surfaces are respectively in true surface-to-surface abutment (in the interface plane) with corresponding surfaces 27 and 28 of dish 22.

The dish element 21 is, in addition, provided for surface-to-surface contact with an axial end flange 30 of brake drum 3¹. The particular interface surface of dish element 21 facing annular surface 23 of flange 30 is exactly as described with reference to FIG. 2 or 4. The outer diameter of annular interface surface 23 of drum flange 30 is larger than the smallest diameter of abutment surface 25. This way, the axial movement of the two wheels relative to each other as well as the axial movement of the wheels relative to drum 3¹ are minimized. Moreover, it was found that the thickness of the wheel dishes can be reduced in order to obtain similar strength and life span as in other constructions. Thus, one can save material and make the wheels lighter. On the other hand, the illustrated construction, using conventional wheel disk thickness, results in considerably stronger wheels and longer life span.

Figure 5:
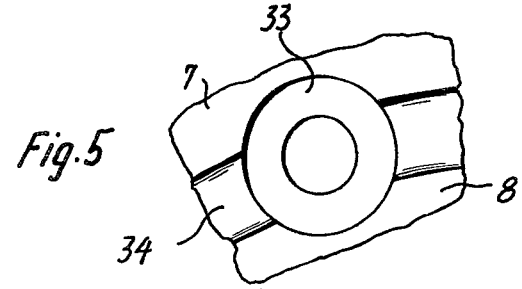
FIG. 5 is a plan view of a modification of a detail of the one shown in FIG. 2.

As was mentioned above, the brake drum flange, such as flange 30 in FIG. 4, can also be provided with an annular recess 29 (annular with respect to the wheel's axis). The same recess or indentation would be provided in the single-wheel construction of FIG. 1. Also, the indentation around the bores, such as bores 15, could be made deeper (portion 33, as shown in FIG. 5) than bottom 34 of indent 6.

The invention is not limited to the embodiments described above; but all changes and modifications thereof, not constituting departures from the spirit and scope of the invention, are intended to be included.

We claim:

1. In a combined wheel and brake drum for a vehicle, wherein the wheel includes a wheel disk having an annular flange provided with a plurality of annularly arranged bores, a hub and the drum each having a flange provided with a matching plurality of annularly arranged bores, one of said latter flanges having annularly extending plane interface surface means, the respective other flange being also provided with interface means for interfacing with the surface means of the one flange, the improvement comprising:

the interface means including a first annular surface portion more radially outward from the bores and extending between the bores, and a second annular surface portion more radially inward from the bores, there being accordingly annular indent means in said interface means, and providing for a relatively locally reduced wall thickness, the annular indent means extending radially between said first and second surface portions for separating the first and second surface portions completely and thus extending from bore to bore of the plurality of bores, the indent means having portions surrounding respectively each one of the bores, radial width dimensions of the indent means being larger for the bore-surrounding portions than in portions extending from bore to bore, at least one of the first and second surface portions being composed of azimuthally separated, annularly arranged, surface portion segments; and bolt means traversing the bores for bolting together the flange of the wheel disk and the flanges of the hub and of the drum, thereby causing the interface means to engage the surface means.

2. The improvement of claim 1, the interface means pertaining to the flange of the wheel disk.

3. The improvement as in claim 2, there being a second wheel placed back to back to the first-mentioned wheel and in an annular interface whose smallest diameter exceeds the longest diameter of the first surface portion.

4. The improvement as in claim 1, wherein the first surface portion is located in an axially offset plane from a plane through the second surface portion.

5. In a wheel construction including a first wheel and a second wheel and brake drum, the improvement comprising:

the first and second wheels mounted to each other in an abutment along a first annular interface having a particular smallest diameter and along another annular interface of a smaller diameter;

the brake drum having a flange bolted to the first wheel, there being a second annular interface between the brake drum flange and the first wheel including an outermost interface portion established by abutting surface portions of the first wheel and the flange, the outermost surface portion having a largest diameter, smaller than said particular smallest diameter;

one of the flanges and the first wheel including interface surface means at said second interface, the interface surface means being traversed by a plurality of annularly arranged bores and including a first annular surface portion more radially outward from the bores and extending between the bores, and a second annular surface portion more radially inward from bores and also extending between the bores;

annular indent means in said one surface means, radially between and separating said first and second surface portions completely and extending from bore to bore of the plurality of bores, the indent means having portions surrounding at least in parts respectively each one of the bores, radial width dimensions of the indent means being larger for the bore-surrounding portions than in portions extending from bore to bore; and bolt means traversing the bores for bolting together the wheels and the flanges of the hub and of the drum, thereby causing the interface means and the surface means to engage.

6. The improvement as in claim 5, wherein at least one of the first and second surface portions is composed of separated, annularly arranged surface portion segments.

* * * * *